United States Patent
Buchold et al.

(10) Patent No.: US 7,342,711 B2
(45) Date of Patent: Mar. 11, 2008

(54) METHOD AND CONTRIVANCE FOR APPLYING A RAMAN AMPLIFICATION IN A TRANSMISSION AND/OR FIBRE DEVICE

(75) Inventors: Bianca Buchold, Nuremberg (DE); Steffen Reichel, Mehlingen (DE); Bernd Teichmann, Nuremberg (DE); Dieter Werner, Neunkirchen am Brand (DE)

(73) Assignee: Lucent Technologies Inc., Murray Hill, NJ (US)

( * ) Notice: Subject to any disclaimer, the term of this patent is extended or adjusted under 35 U.S.C. 154(b) by 943 days.

(21) Appl. No.: 10/345,712

(22) Filed: Jan. 16, 2003

(65) Prior Publication Data
US 2003/0142394 A1    Jul. 31, 2003

(30) Foreign Application Priority Data
Jan. 16, 2002    (EP)    .................................. 02250313

(51) Int. Cl.
*H01S 3/00*    (2006.01)
(52) U.S. Cl. ..................................... 359/334
(58) Field of Classification Search ................. 359/334
See application file for complete search history.

(56) References Cited

U.S. PATENT DOCUMENTS

| | | | |
|---|---|---|---|
| 4,401,364 A | 8/1983 | Mochizuki | 385/27 |
| 4,699,452 A | 10/1987 | Mollenauer et al. | 350/96.16 |
| 4,720,684 A | 1/1988 | Byron | 359/334 |
| 4,740,974 A | 4/1988 | Byron | 372/3 |
| 4,790,619 A | 12/1988 | Lines et al. | 350/96.16 |
| 4,881,790 A | 11/1989 | Mollenauer | 350/96.16 |
| 5,039,199 A | 8/1991 | Mollenauer et al. | 359/334 |
| 5,887,093 A | 3/1999 | Hansen et al. | 385/27 |
| 6,292,288 B1 * | 9/2001 | Akasaka et al. | 359/334 |
| 6,342,965 B1 | 1/2002 | Kinoshita | 359/334 |
| 6,424,455 B1 * | 7/2002 | Dmitri | 359/334 |
| 6,547,453 B1 * | 4/2003 | Stummer et al. | 385/88 |
| 6,574,037 B2 * | 6/2003 | Islam et al. | 359/334 |
| 6,717,963 B1 * | 4/2004 | Foursa | 372/3 |
| 6,775,057 B2 * | 8/2004 | Akasaka et al. | 359/337.5 |
| 2001/0046083 A1 | 11/2001 | Akasaka et al. | 359/334 |
| 2001/0050802 A1 | 12/2001 | Namiki et al. | 359/337 |
| 2003/0016437 A1 * | 1/2003 | Islam et al. | 359/334 |
| 2005/0012987 A1 * | 1/2005 | Okuno | 359/334 |

FOREIGN PATENT DOCUMENTS

EP    1130704 A2    9/2001

\* cited by examiner

*Primary Examiner*—Mark Hellner
*Assistant Examiner*—Eric Bolda

(57) ABSTRACT

Raman amplification is used in optical transmission systems, devices and/or components way of for applying Raman amplification avoiding or suppressing detrimental and hence undesirable non-linear effects is provided. Raman amplification in an optical device is provided by firstly determining a pump power (3) necessary for providing Raman amplification and then by providing a low spectral power density by pumping the optical device with pump power (3) at a relatively broad pump power spectrum and preferably a low spectral pump power amplitude such that the total output pump power (3) remains sufficiently high. The pump power (3) is optically attenuated prior to being coupled to the optical device.

7 Claims, 2 Drawing Sheets

METHOD AND CONTRIVANCE FOR APPLYING A RAMAN AMPLIFICATION IN A TRANSMISSION AND/OR FIBRE DEVICE

CROSS REFERENCE TO RELATED APPLICATION

This application claims priority of European Application No. 02250313.0 filed on Jan. 16, 2002.

BACKGROUND OF THE INVENTION

1. Field of the Invention

The invention relates to a method and to an apparatus for applying Raman amplification.

2. Description of Related Art

As known, in optical transmission systems, semiconductor lasers or semiconductor laser diodes are often used as light emission devices. Based thereon, the semiconductor lasers or laser diodes can also be used as so-called pump lasers for employing Raman amplification or distributed Raman amplification. Such Raman amplification is increasingly used within high capacity wavelength division multiplex (WDM) systems operating at a high bit rate of at least 10 Gbit/s, in particular exceeding 10 Gbit/s by a multiple and seems to be indispensable in order to improve the system performance, in particular as regards spanned transmission distance.

In this case it is necessary to achieve high optical power level, exceeding a magnitude of 100 mW by a multiple that are pumped inside the respective optical device, such as an optical transmission fibre, a fibre component or any other optical waveguide usable therefore.

For enabling such a Raman amplification the separation in frequency between the data signal to be transmitted and the pump power usually has to be about 13.2 THz. Correspondingly, if the data signal to be transmitted has a wavelength of about 1550 nm, the power of the pump signal should be at a wavelength approximately 110 nm lower than that amplified data signal wavelength.

Currently, Raman amplifiers in use are fibre lasers, using a pump power of up tp 2 W and a spectral width of less than 1 nm, or are so-called fibre Bragg Grating stabilised Fabry-Perot type lasers having a pump power up to 200 mW and a spectral width of less than 2 nm.

However, the spectral distribution of such Raman pump powers is very important. If, for example, the Raman pump provides all the pump power with a high spectral power density such as employed by the aforementioned currently used lasers, in addition to the Raman effects, certain further detrimental non-linear effects are generated. These non-linear effects include, for example, Four Wave Mixing (FWM) and/or a Stimulated Brillouin Scattering (SBS). This results in a reduced efficiency of the Raman amplification or even in degradation of the entire system performance.

SUMMARY OF THE INVENTION

An object of the invention is therefore to provide, compared to the known state of the art, a new and improved way of proceeding for applying Raman amplification avoiding the aforementioned problems, in particular suppressing such detrimental and hence undesirable non-linear effects when applying Raman amplification to respective optical devices, such as optical transmission systems and fibre or waveguide devices.

The inventive solution of the object is achieved by a method and apparatus according to the independent claims.

Advantageous and/or preferred embodiments or refinements are the subject matter of the respective dependent claims.

Accordingly, it is proposed to apply Raman amplification in an optical device, such as for example an optical transmission fibre, a fibre component and/or a waveguide device, by firstly determining a pump power necessary for providing Raman amplification and then by providing a low spectral power density by pumping the optical device with pump power at a relatively broad pump power spectrum, and preferably a low spectral pump power amplitude, such that the total output pump power remains sufficiently high.

The inventive solution is based on the realisation that undesired non-linear effects in the transmission and/or fibre device are avoided by pumping the optical device with a broad spectral width, such that a high output power as necessary may still be still ensured, but with a relative low spectral power amplitude.

It has been turned out that the pumping with longitudinal modes distributed over a spectral width of about 10 nm to 20 nm is sufficient. Based thereon, the spectral power density incorporates respective wavelengths of maximal intensities making up an emission spectrum generally without any non-linearity and/or modulated signal adjoined on either sides of the respective wavelengths.

In practice, preferably Fabry-Perot type lasers are used for the inventive solution, since these are already available on the market and are relatively inexpensive.

Since the inventive solution provides a high output pump power incorporating low noise, broad, relatively flat and high amplification of the data signal to be transmitted is ensured. Advantageously, due to the low noise of the pumping power, the inventive approach can be employed in optical devices for co-pumping purposes but additionally and/or alternatively for counter-pumping purposes, i.e. for pumping the pump light in the same propagation direction as the data signal light.

Accordingly, one of the preferred application for the inventive method or apparatus is the field of Wave Division Multiplexing (WDM) or a Dense Wave Division Multiplexing (DWDM) combining multiple wavelength on a single fibre for transmitting fare more than 10 Gbit/s of information. Moreover, the pump powers of a multiple of pump sources may be fed into such an optical device at definable transmission distances to enable an optical data signal transmission over very long transmission distances exceeding for example multiples of 100 km.

Since additional lossy components for example gratings, are avoided by using a laser emitting several longitudinal modes, more pump power can be coupled into the transmission fibre. Thus, the preferred provision of a Fabry-Perot laser structure without Fibre Bragg Grating causes very low noise and substantially avoids any back reflections.

To avoid a shift of the centre wavelength of the emission spectrum due to a variation of the output power by changing the bias current, it is preferably proposed to provide a variable optical attenuator between the pump power emission source configuration and the optical transmission and/or fibre device for definable tuning of the Raman pump power.

BRIEF DESCRIPTION OF THE DRAWINGS

The invention is described in more detail based on a preferred embodiment and with regard to the accompanied Figures, in which.

DETAILED DESCRIPTION

Figure 1:
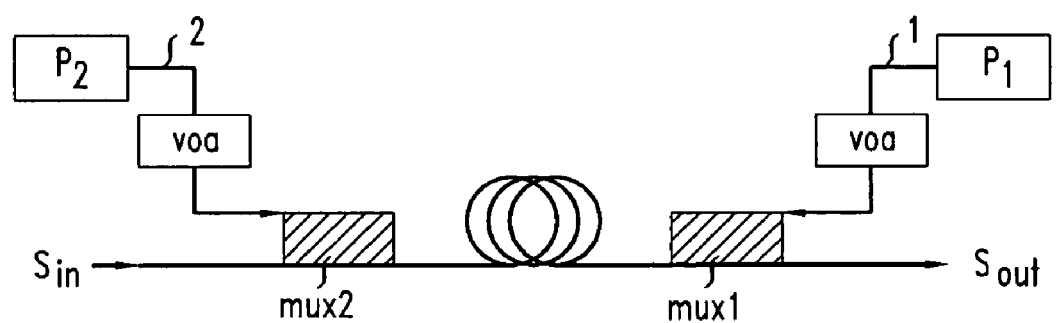
FIG. 1 is a schematically depicted co- and counter-pumping arrangement for a distributed Raman amplification according to the invention.

FIG. 1 depicts, by way of example, a configuration for a preferred co- and counter-pumping application for a distributed Raman amplification. Based thereon a data signal $S_{in}$ to be transmitted is fed into an optical transmission path. The data signal $S_{in}$ preferably comprises a multiple of channels, i.e. a multiple of wavelengths that are combined and/or modulated as known by person skilled in the art. Correspondingly, after a transmission distance, at a receiving side the data signal $S_{out}$ is demultiplexed into the multiple of channels retrieving the information embedded within each of the channels comprised by the data input signal $S_{in}$.

Accordingly the simplified depicted arrangement of FIG. 1 is adapted for use within high capacity WDM or DWDM systems operating at high bit rates of at least 10 Gbit/s. A transmission distance is schematically represented by a span of an optical fibre having a transmission distance for example of 80 or 100 km without an additional repeater unit.

Two Raman pump sources, identified with the reference signs $p_1$ and $p_2$ are arranged such that the pump source unit $p_1$ is adapted to provide a counter-pumping configuration and the pump source unit $p_2$ provides a co-pumping configuration with regard to the amplified data signal. The counter directed pump power 1 of the pump source $p_1$ is combined by the multiplexer $mux_1$ with the data signal $S_{out}$ to provide a very high signal gain. Correspondingly, for employing co-pumping, the output pump power 2 of the pump power unit $p_2$ is combined by the multiplexer $mux_2$ with the input data signal $S_{in}$.

The total transmission distance of an optical transmission system may comprise several partial transmission distances as based on the configuration of FIG. 1. Hence, the pump powers of a multiple of pump sources $p_1$ and/or $p_2$ may be fed into an optical transmission system device at definable transmission distances, for example after optical fibre spans respectively of 100 km, to enable the transmission of an optical data signal over very long transmission distances exceeding 100 km by a multiple.

Figure 2:
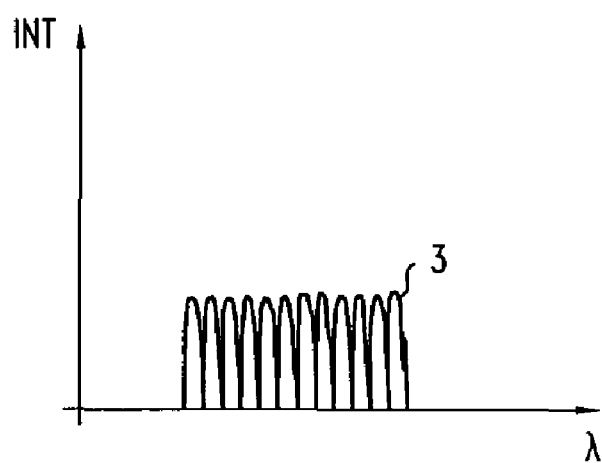
FIG. 2 is a schematically depicted power spectrum of the proposed broadband pump spectrum with a low spectral power density according to the invention and FIG. 3 is a schematic representation of a conventional small-band pump with high spectral power density.

Each of the pump source units $p_1$ and $p_2$, as depicted in FIG. 1, preferably comprises a Fabry-Perot type laser providing a high output power with a broad spectrum 3 as schematically depicted in FIG. 2.

Such a laser may be produced for example from compound semiconductors comprising Gallium, Arsenic, Aluminium, Phosphorus and Antimony and the ternary and/or quaternary compounds thereof such as Aluminium Gallium Indium Phosphide (AlGaInP) or Indium Arsenic Phosphide (InAsP).

As can be seen from FIG. 2 the entire pump energy 3 is distributed over a relative broad spectral width, i.e. covering a plurality of wavelengths □ thereby being of a relative low spectral power amplitude or intensity Int. As shown in FIG. 2, a preferred pump power spectrum is based on the spectrum of multi-longitudinal modes emitted by a Fabry-Perot type laser, and is distributed over a wavelength area from 10 nm to 20 nm.

Figure 3:
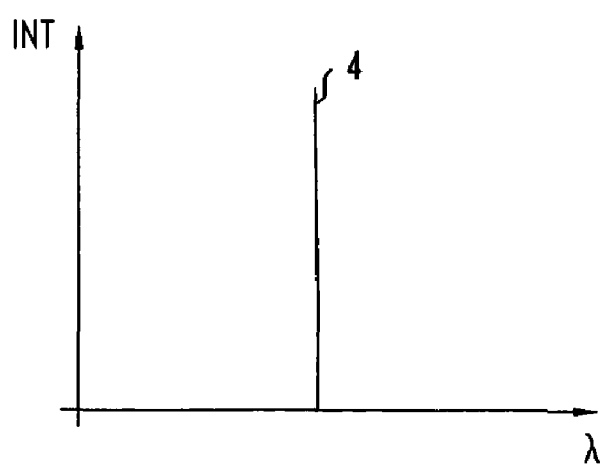

In contrast thereto, the spectral distribution of a conventional pump power employed according to the state of the art is principally depicted in FIG. 3. As can be seen, the conventional small band pump distribution 4 has a high spectral power density in comparison to the proposed inventive solution for providing a similar overall output power.

It has been realised, that by applying a broad band pump spectrum 3 according to FIG. 2 around each of the respective wavelengths having the maximal amplitudes, less fluctuations of the power levels occur compared to a narrow band pump spectrum of FIG. 3. Thus, a pump energy 3 generally without any non-linearity and/or modulated signal portions is provided for performing Raman amplification. Hence, whilst ensuring a same high output power as the state of the art, the pump spectrum 3 of the inventive approach has a very low noise in the pump power itself.

As a result, due to the very low noise associated to the pump power, non-linear effects, like for wave mixing or stimulated Brillouin scattering are avoided, or at least suppressed within the optical device.

Consequently, the inventive method can be used for counter-pumping providing a high Raman amplification in the data signal band but even can be applied for co-pumping proposes as indicated in FIG. 1, in particular to improve the optical signal to noise ratio (OSNR) at the beginning of a transmission distance. Additionally, in particular at the end of a transmission distance, the lowered noise of the inventive pump signal ensures a stabile and effective Raman amplification in the signal band providing a high signal gain near the respective receiver side.

Consequently, in contrast to existing solutions using small band Raman pumps, for example by use of an external resonator, such as a Bragg grating, a decrease of Raman amplification or degradation of system performance due to non-linear effects influencing the pump power in the optical device can be easily avoided.

Hence, by use of the invention a broad, flat and high Raman amplification can be inexpensively provided. Furthermore, since additional lossy components are avoided more pump power can be coupled into the optical device by using a laser emitting several longitudinal modes, such as the aforementioned Fabry-Perot type laser.

However, by lowering the laser current in order to have a lower output power, the centre wavelength of the broad output power spectrum could significantly move to a lower wavelength, in particular due to a lower carrier injection into the semiconductor material of the pump power source, and hence the shape of the spectrum could be changed as well. To avoid such a wavelength variation, a variable optical attenuator(VOA) may be coupled between each the pump source unit $p_1$, $p_2$ and the optical device, in particular the respective multiplexer $mux_1$ or $mux_2$, shown in FIG. 1. As a result, the pump source unit $p_1$, $p_2$ may be always operated with the highest output power thereby yielding a stabile output power spectrum. Thus, for tuning the Raman pump power sources $p_1$ and/or $p_2$, the respective variable optical attenuator can be set to attenuate the pump power 3 as needed and thus to control the power level or power intensity without changing the spectrum itself.

It has to be understood, that the invention also is covering embodiments correspondingly adapted to be used in respective specific configurations of fibre transmission systems, fibre devices or components, or other optical waveguides without departing the scope of protection as defined in the appended set of claims.

We claim:

1. Method for applying Raman amplification in an optical device, in particular in an optical transmission fibre, a fibre component and/or a waveguide device, comprising the steps of:
providing a low spectral power density by pumping the optical device with a pump power having a spectral power width of at least several nanometers wherein the pump power which is provided by a Raman pump source is optically attenuated prior to being coupled to the optical device so as to vary pump power whilst maintaining output power from the Raman pump source constant thereby avoiding a shift in centre wavelength of its emission spectrum.

2. Method of claim 1, wherein the optical device is pumped with longitudinal modes distributed over 10 nm to 20 nm.

3. Method of claim 1, wherein the optical device is co-pumped and/or counter-pumped.

4. Method of claim 1, wherein the pump power of a multiple of pump sources is fed into the optical device at definable transmission distances.

5. Method of claim 1, further comprising the step of using said method within high capacity wavelength division multiplex (WDM) and/or dense wavelength division multiplex (DWDM) systems.

6. An apparatus for applying Raman amplification in an optical device, in particular in an optical transmission fibre, a fibre component and/or a waveguide device, wherein a Raman pump source provides an output pump power with a low spectral power density based on a spectral power width of at least several nanometers, wherein a variable optical attenuator coupled between the Raman pump source and the optical device so as to vary pump power whilst maintaining output power from the Raman pump source constant thereby avoiding a shift in centre wavelength of its emission spectrum.

7. The apparatus of claim 6, wherein the Raman pump configuration includes a Fabry-Perot type laser.

* * * * *